(12) United States Patent
Kim et al.

(10) Patent No.: US 11,915,393 B2
(45) Date of Patent: Feb. 27, 2024

(54) IMAGE ACQUISITION METHOD FOR TIME OF FLIGHT CAMERA

(71) Applicants: SK hynix Inc., Gyeonggi-do (KR); Korea Advanced Institute of Science and Technology, Daejeon (KR)

(72) Inventors: Min Hyuk Kim, Daejeon (KR); Daniel S. Jeon, Daejeon (KR)

(73) Assignees: SK hynix Inc., Icheon-si (KR); Korea Advanced Institute of Science and Technology, Daejeon (KR)

( * ) Notice: Subject to any disclaimer, the term of this patent is extended or adjusted under 35 U.S.C. 154(b) by 49 days.

(21) Appl. No.: 17/540,632

(22) Filed: Dec. 2, 2021

(65) Prior Publication Data
US 2023/0010725 A1    Jan. 12, 2023

(30) Foreign Application Priority Data

Jul. 12, 2021   (KR) ........................ 10-2021-0090674

(51) Int. Cl.
| | | |
|---|---|---|
| G06T 5/00 | (2006.01) | |
| G06T 5/50 | (2006.01) | |
| G06T 5/40 | (2006.01) | |
| G06T 7/00 | (2017.01) | |
| G01S 17/894 | (2020.01) | |
| H04N 23/80 | (2023.01) | |

(52) U.S. Cl.
CPC ............ *G06T 5/002* (2013.01); *G01S 17/894* (2020.01); *G06T 5/40* (2013.01); *G06T 5/50* (2013.01); *G06T 7/0002* (2013.01); *H04N 23/80* (2023.01); *G06T 2207/10028* (2013.01); *G06T 2207/10048* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 2013/0083893 | A1* | 4/2013 | Ishii | ................ G01N 23/20075 |
| | | | | 382/173 |
| 2020/0333467 | A1 | 10/2020 | Koppal et al. | |
| 2020/0393245 | A1* | 12/2020 | Ortiz Egea | ............ H04N 23/81 |
| 2021/0033731 | A1* | 2/2021 | Xu | ......... G01S 7/4915 |
| 2021/0390719 | A1* | 12/2021 | Ortiz Egea | ............ G06T 7/521 |
| 2022/0383455 | A1* | 12/2022 | Ortiz Egea | ............ G06T 5/002 |

FOREIGN PATENT DOCUMENTS

| | | | |
|---|---|---|---|
| KR | 2013-0099735 A | 9/2013 | |
| WO | WO-2021188625 A1 * | 9/2021 | ............ G01S 17/36 |
| WO | WO-2022204895 A1 * | 10/2022 | |

OTHER PUBLICATIONS

English translation of WO-2022204895-A1, Chou et al, Oct. 2022 (Year: 2022).*

* cited by examiner

*Primary Examiner* — James M Hannett

(57) ABSTRACT

A method of reduce the impact of noise on a depth image produced using a Time Of Flight (TOF) camera uses an infrared image produced from one or more phase-specific images captured by the TOF camera to determine whether to move pixels in the depth image from one phase section to another.

7 Claims, 9 Drawing Sheets

IMAGE WITH FIRST FREQUENCY

RELIABILITY EVALUATION IMAGE

IMAGE ACQUISITION METHOD FOR TIME OF FLIGHT CAMERA

CROSS-REFERENCE TO RELATED APPLICATION

This application claims priority under 35 U.S.C. § 119 to Korean Patent Application No. 10-2021-0090674 filed on Jul. 12, 2021, which is incorporated herein by reference in its entirety.

BACKGROUND

1. Field

The present disclosure relates to a technology for reducing noise in an image captured by a time of flight (TOF) camera. The present disclosure relates to a technology of reducing noise by correcting an error which occurs when unwrapping a TOF image using multiple frequencies to produce a depth image, through statistical analysis with neighboring pixels, and determining depth information to be similar between similar pixels in order to optimize the depth image.

2. Discussion of the Related Art

Recently, with the development of a semiconductor technology, functions of Information Technology (IT) devices with built-in cameras have become more diversified. Technologies of acquiring and processing images using charge coupled devices (CCD) or CMOS image sensor (CIS) devices have also been rapidly developed.

Among technologies for acquiring three-dimensional images, time-of-flight (TOF) techniques have been widely used recently. The TOF refers to a process of measuring a time required for light emitted from a light source and reflected from a subject to returns to the light source, calculating a distance between the light source and the subject according to that time, and thereby acquiring a depth image. Among the TOF techniques, a process of calculating a distance by a time difference between the time when light departed from a light source and the time when the light reflected from a subject reached a sensor located near the light source is called a direct TOF method. Since the speed of light is constant, it is possible to easily and simply calculate a distance between a light source and a subject by finding the time difference. However, this method has the following disadvantages. Since light travels 30 centimeters in one nanosecond, a resolution of picoseconds may be required in order to acquire a usable depth image of the subject. However, it is somewhat difficult to provide the resolution of picoseconds at the current operating speed of semiconductor devices.

In order to solve such a problem, an indirect TOF (I-TOF) process has been developed. This is a method in which light is modulated with a signal having a specific frequency for transmission, and when the modulated signal reflected from a subject has reached a sensor, a phase difference between the modulated and received signals is detected to calculate the distance to the subject. The modulation process may use a pulse signal or a sine wave. In the case of using a pulse signal, a process of acquiring a necessary image by measuring signals at different time periods with signals having four different phases and then unwrapping a depth image using phase values is widely used. FIG. 1 and FIG. 2 are diagrams for explaining such a process. Four images respectively acquired using the four different phases are labeled Q1 to Q4, respectively. In each of the upper four images shown in FIG. 2, an intensity of a pixel corresponds to a degree of overlap between the pulse in the reflected wave and a pulse in the corresponding phase, wherein the degree of overlap corresponds to the shaded regions in FIG. 1. It is well known that a depth image from the four images may be restored using a phase restoration function with an arc tangent, such as the phase restoration function shown in FIG. 2.

However, the I-TOF has a problem in that it is difficult to measure an accurate depth value when the range of a depth image exceeds the distance light travels during a period of a pulse signal, and a distance to a subject is limited. The related art for solving such a problem is a method of using phases having two or more frequencies to acquire a plurality of images. When images acquired with phases of two frequencies are combined, long-distance images may also be properly restored, but when the long-distance images are unwrapped from the acquired images, noise may be involved, which may produce an error and affect the quality of the restored images.

RELATED ART DOCUMENT

[Patent Document]
Patent Document 1: US Patent Application Publication No. 2020/0333467 published on Oct. 22, 2020.
Patent Document 2: Korean Patent Application Publication No. 10-2013-0099735 published on Sep. 6, 2013.

SUMMARY

The technical problem addressed by the present disclosure is to provide a process of correcting a depth image so that an error caused by noise is removed when a TOF camera is used.

Another technical problem addressed by the present disclosure is to provide a process for estimating an error value for each pixel when a depth image of a subject is acquired using a TOF camera, and using the estimated error value in securing image quality.

Another technical problem addressed by the present disclosure is to provide a process for improving the quality of a depth image of a subject by acquiring an error value for each pixel using a mathematical process when the depth image of the subject is acquired using a TOF camera.

An embodiment of the present disclosure for solving the above problems is an image acquisition method for a TOF camera, which includes: a step of acquiring an image with a first frequency and an image with a second frequency; a step of acquiring an unwrapped image based on the acquired images; a step of selecting a partial area from the unwrapped image; a step of distinguishing some pixels among pixels belonging to the partial area from other pixels; and a step of moving a phase section to which erroneously unwrapped pixels belong to another phase section.

Another embodiment of the present disclosure for solving the above problems is an image acquisition method for a TOF camera, which includes: a step of acquiring an initial image from a TOF camera; a step of unwrapping the initial image; a step of acquiring an infrared image from the initial image; a step of filtering the initial image based on dispersion; a step of correcting the unwrapped initial image; and a step of performing denoising based on the infrared image, an image acquired by the filtering, and an image acquired in the step of correcting.

According to the present disclosure, it is possible to secure a long-distance image, which is relatively unconstrained by a distance to a subject, by a TOF camera and to minimize an influence of noise that may be involved in the unwrapping of the image. Consequently, it is possible to achieve a high-quality restored image.

DETAILED DESCRIPTION

Figure 1:
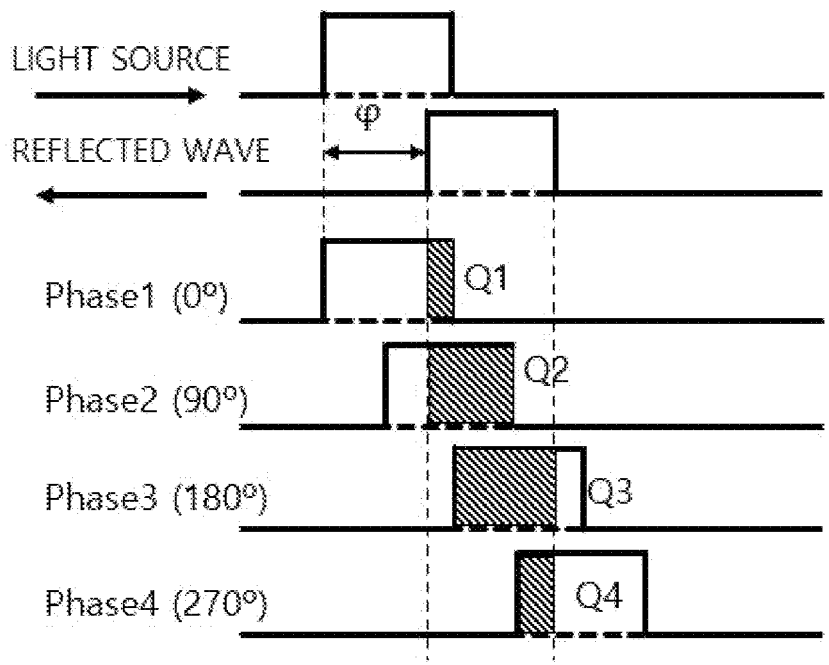
FIG. 1 illustrates an operation principle of a camera using an indirect TOF method.

Hereinafter, embodiments of the present disclosure will be described in detail with reference to the accompanying drawings such that the present disclosure can be easily carried out by those skilled in the art to which the present disclosure pertains. The same reference numerals among the reference numerals in each drawing indicate the same members.

In the description of the present disclosure, when it is determined that detailed descriptions of related publicly-known technologies may obscure the subject matter of the present disclosure, the detailed descriptions thereof will be omitted.

The terms such as first and second may be used to describe various components, but the components are not limited by the terms, and the terms are used only to distinguish one component from another component.

Hereinafter, the present disclosure will be described with reference to the related drawings.

Figure 3:
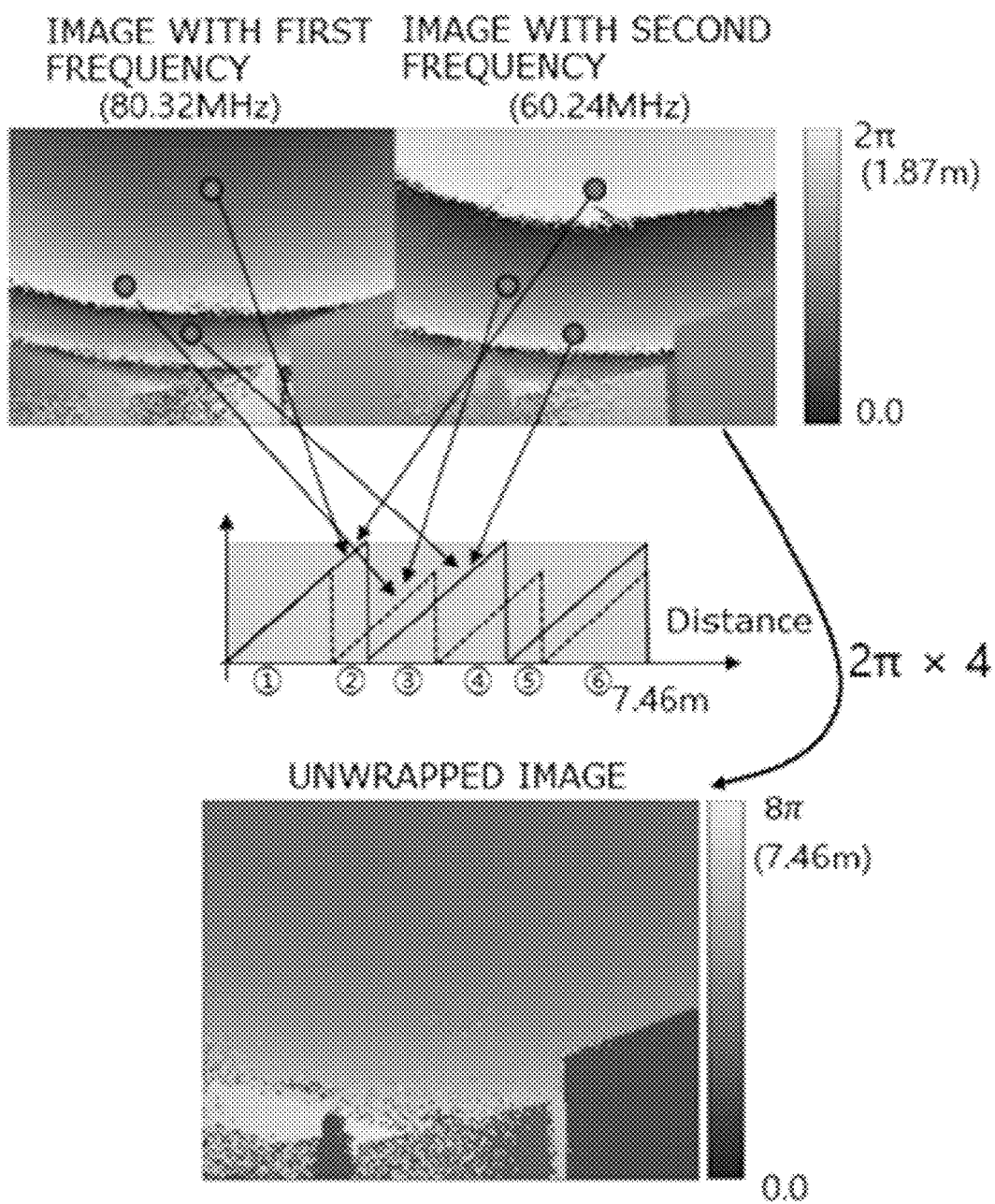
FIG. 3 illustrates a process of restoring an unwrapped image from images acquired using a plurality of frequencies.

A process of acquiring an unwrapped image from multi-frequency images as illustrated in FIG. 3 will be described as an example. When a pulse signal with multiple frequencies, for example, a first frequency of 80.32 MHz and a second frequency of 60.24 MHz, is used, phases of the first frequency and the second frequency coincide with each other again after four periods and three periods from the same start point, and this behavior is repeated. Hereinafter, for convenience of description, such a period in which multiple frequencies are repeated is referred to as a 'repetition period' and is equal to the inverse of the greatest common divisor (GCD) of the first and second frequencies.

Here, that GCD is 20.08 MHz, and accordingly in the example of FIG. 3, 4.98 nanoseconds is the repetition period. Since the first frequency and the second frequency are pulses having different phases, the image may be divided into sections in which phases are relatively changed within one repetition period. For example, in FIG. 3, wherein a dashed line in the graph indicates a distance measurement produced using the first frequency of 80.32 MHz and a solid line in the graph indicates a distance measurement produced using the second frequency of 60.24 MHz, section ① is a section in which the first frequency and the second frequency overlap each other (that is, have identical phase angles and therefore produce images with identical distance values), section ② is a section in which the first frequency transitions into a new cycle first and therefore the first frequency produces a distance much less than the distance produced by the second frequency, section ③ is a section in which the second frequency transitions into a new cycle subsequent to the transition into a new cycle of the first frequency and therefore the first frequency produces a distance greater than the distance produced by the second frequency, and section ④, section ⑤, and section ⑥) may be described in a similar way.

Therefore, in FIG. 3, an image with the first frequency is an image acquired during the repetition period, that is, during which the pulse of 80.32 MHz is repeated four times, and an image with the second frequency is an image acquired during which the frequency of 60.24 MHz is repeated three times. When one repetition period (here, 4.98 nanoseconds) is converted into a distance that can be measured without ambiguity by multiplying it by one-half the speed of light, the distance is 7.46 meters. For the first frequency of 80.32 MHz, a distance corresponding to one period is 1.87 meters, and for the second frequency of 60.24 MHz, a distance corresponding to one period is 2.49 meters.

When frequency information is properly used, the image acquired using the first frequency and the image acquired using the second frequency during the repetition period, or an image overlapped by a combination thereof may be restored through proper unwrapping, and the resulting image is referred to as an unwrapped image as illustrated in FIG. 3. In other words, for the two frequencies used in this example, six sections correspond to six cases, and from the information in the images acquired using the two frequencies, it is possible to know which of the cases a specific pixel corresponds to, so that it becomes possible to restore a proper image having proper distances by unwrapping an image.

Figure 4:
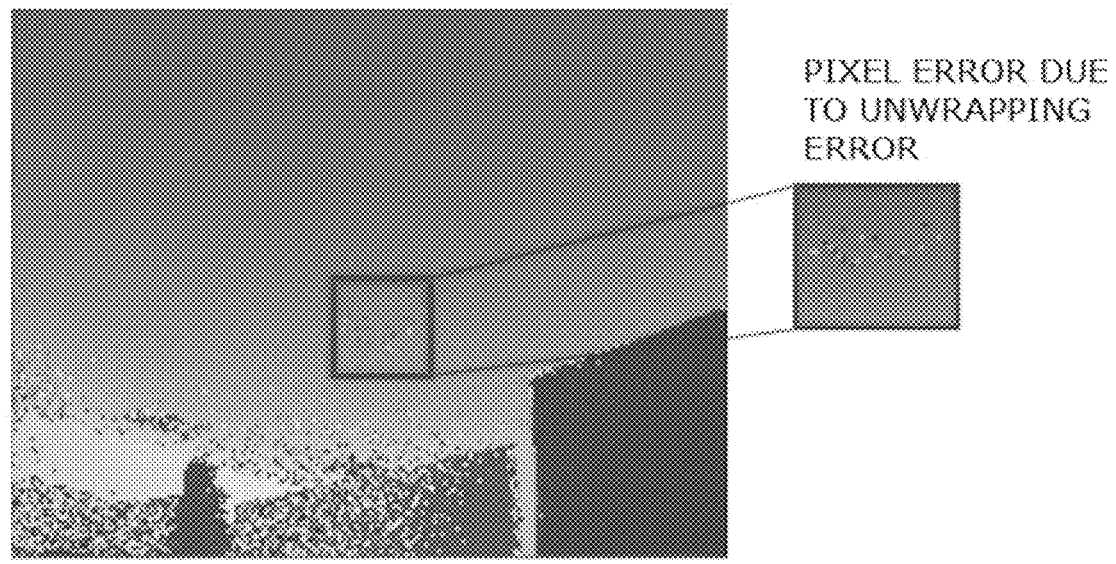
FIG. 4 shows a pixel area showing an error due to noise involved in a process of restoring an image by unwrapping according to an embodiment.
Figure 5:
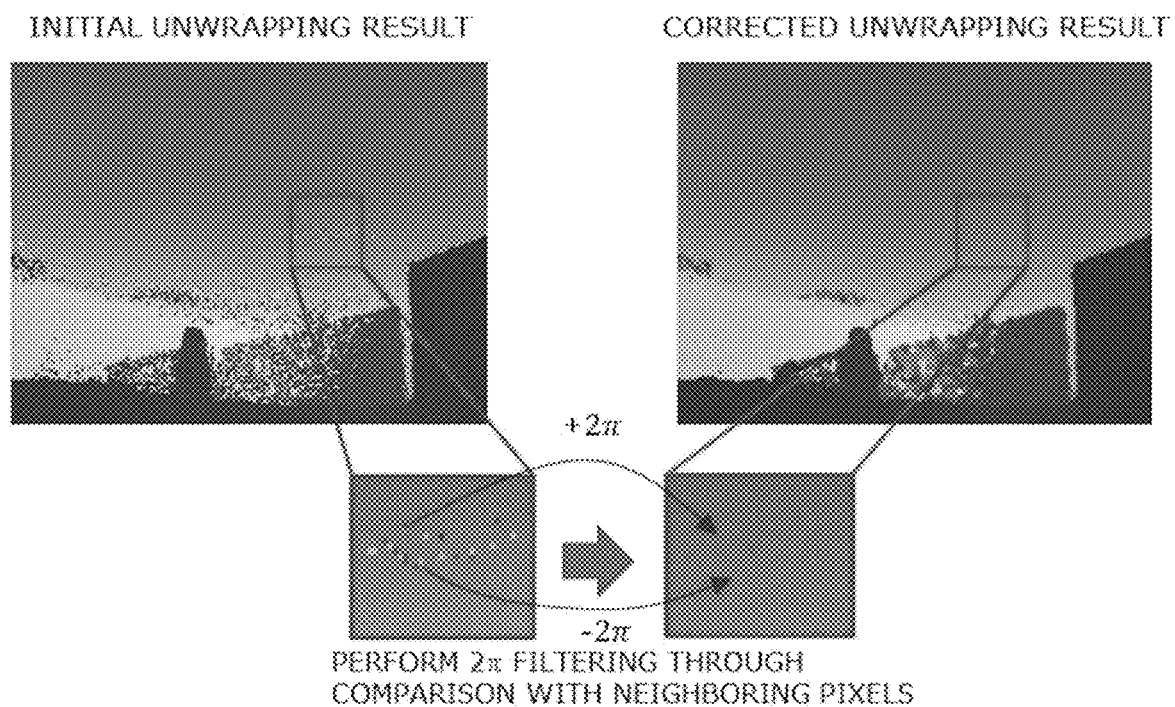
FIG. 5 illustrates a process for correcting unwrapping by skipping one period of a frequency.

However, there is a possibility that a pixel error will occur due to a problem such as noise introduced when an unwrapping operation is performed, noise in the image acquired using the first frequency, or noise in the image acquired using the second frequency. An example of FIG. 4 illustrates a pixel error that occurs when pixel data that in the absence of the error would belong to section ③ is instead determined to belong to a section before or after one period due to the error. That is, the example of FIG. 4 illustrates a result in which a difference of $2\pi N$, which is an integer multiple of one period, occurs due to erroneous unwrapping of the pixel data. Therefore, in an embodiment, if a first unwrapping (referred to as an 'initial unwrapping') is wrong, when the pixel data is adjusted by $2\pi N$ through comparison with surrounding values, a corrected unwrapping (referred to as a 'correction unwrapping') result illustrated in FIG. 5 may be acquired.

Figure 6:
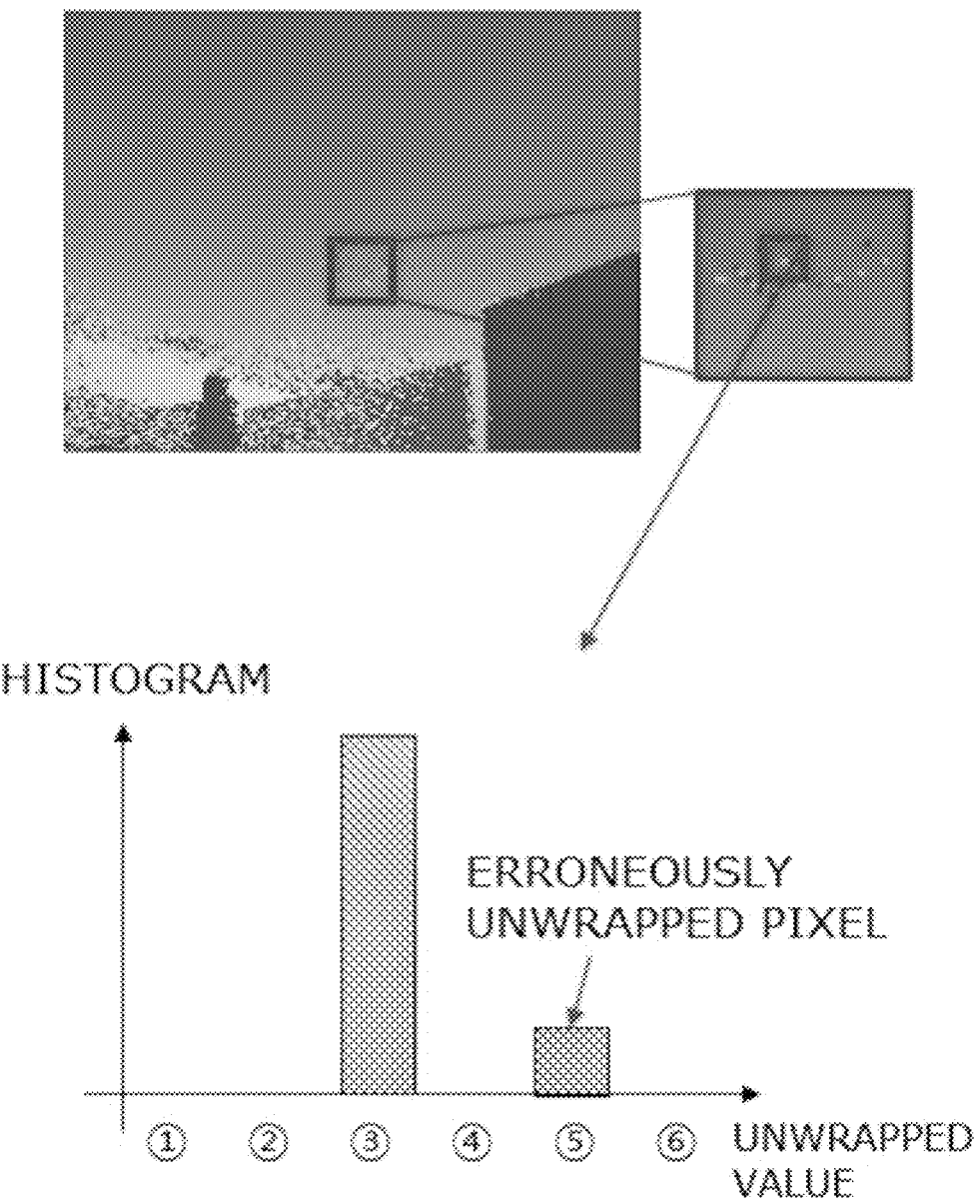
FIG. 6 illustrates an erroneously unwrapped pixel due to involved noise.
Figure 7:
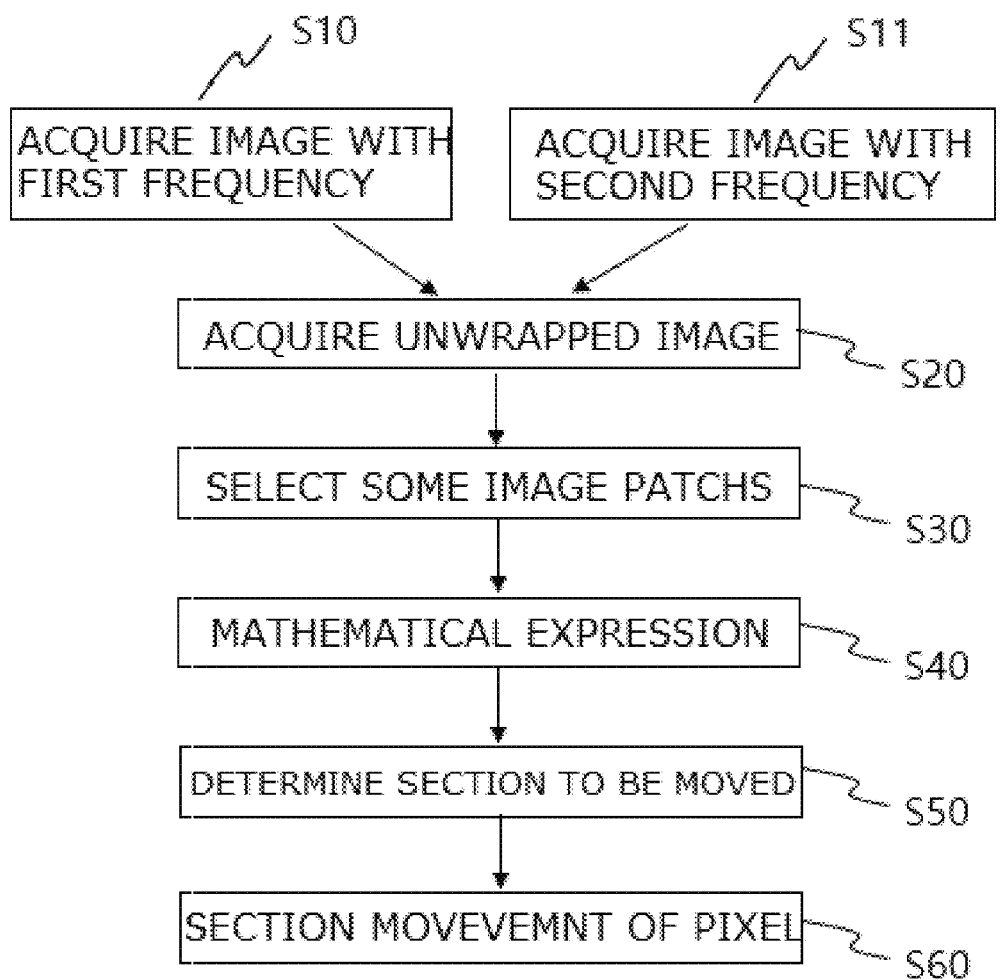
FIG. 7 is a flowchart of a process of moving a pixel section by correction unwrapping according to an embodiment.

One embodiment of a process of performing correction unwrapping will be described with reference to steps illustrated in FIG. 7. First, an image produced using a first frequency and an image produced using a second frequency are acquired with a TOF camera (steps S10 and S11). An unwrapped image is acquired with these images (step S20). Pixels in a certain area including erroneously unwrapped pixels, for example, pixels of a 3×3 patch are selected from the unwrapped image (step S30). Next, when an unwrapping section of the pixels belonging to the area is expressed using a mathematical tool, for example, a histogram, the pixels are divided into properly unwrapped pixels and erroneously unwrapped pixels as illustrated in FIG. 6 (step S40). Most of the pixels in the patch are unwrapped to belong to section ③, but some pixels are unwrapped to belong to section ⑤, which is taken as an indication that the pixels in section ⑤ are erroneously unwrapped pixels. Then, the erroneously unwrapped pixels are compared with adjacent pixels and it is determined whether to move the erroneously unwrapped pixels to a section to which most of the adjacent pixels belong (step S50). The erroneously unwrapped pixels are moved to section ③ according to the comparison result (step S60). The movement is effectively performed according to comparison of the values of the erroneously unwrapped pixels with surrounding values. At this time, it is preferable to use a mode filter. In such a case, a 3×3 mode filter for coping with the 3×3 patch is suitable. In this way, a corrected unwrapping result may be acquired. This series of steps are illustrated in the flowchart of FIG. 7.

Figure 8:
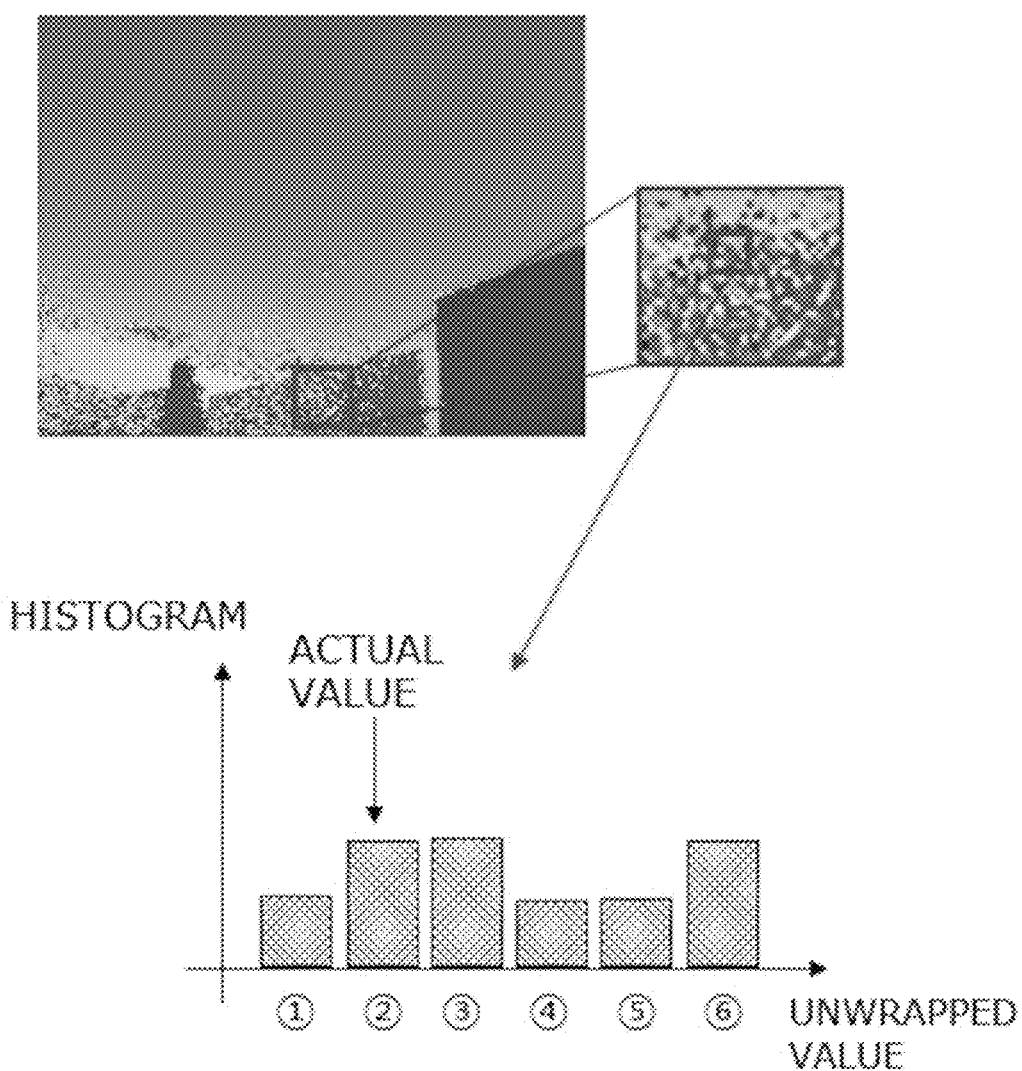
FIG. 8 illustrates a pixel area where a lot of noise is involved.

In another embodiment, an area including a lot of noise in an unwrapped image is corrected. For example, it is preferable to correct an area including a lot of noise, such as an area illustrated in FIG. 8, by using a mode filter, or in another embodiment without using the mode filter. As illustrated in the histogram of FIG. 8, a properly unwrapped value belongs to section ②, but is less prominent than values erroneously unwrapped and dispersed into other sections due to involved noise. That is, in this example, a dispersion value is large. When the dispersion value is large, it means that the reliability of an image is reduced. Due to such characteristics, correction through comparison with neighboring pixels becomes more difficult. When such a case occurs, embodiments may remove noise based on an infrared intensity value calculated by the TOF camera. This process is based on the principle that when the pixel intensity value of an erroneously unwrapped pixel is similar to that of a neighboring pixel, they are highly likely to be the same subject, and therefore depth values thereof are also highly likely to be similar.

Figure 9:
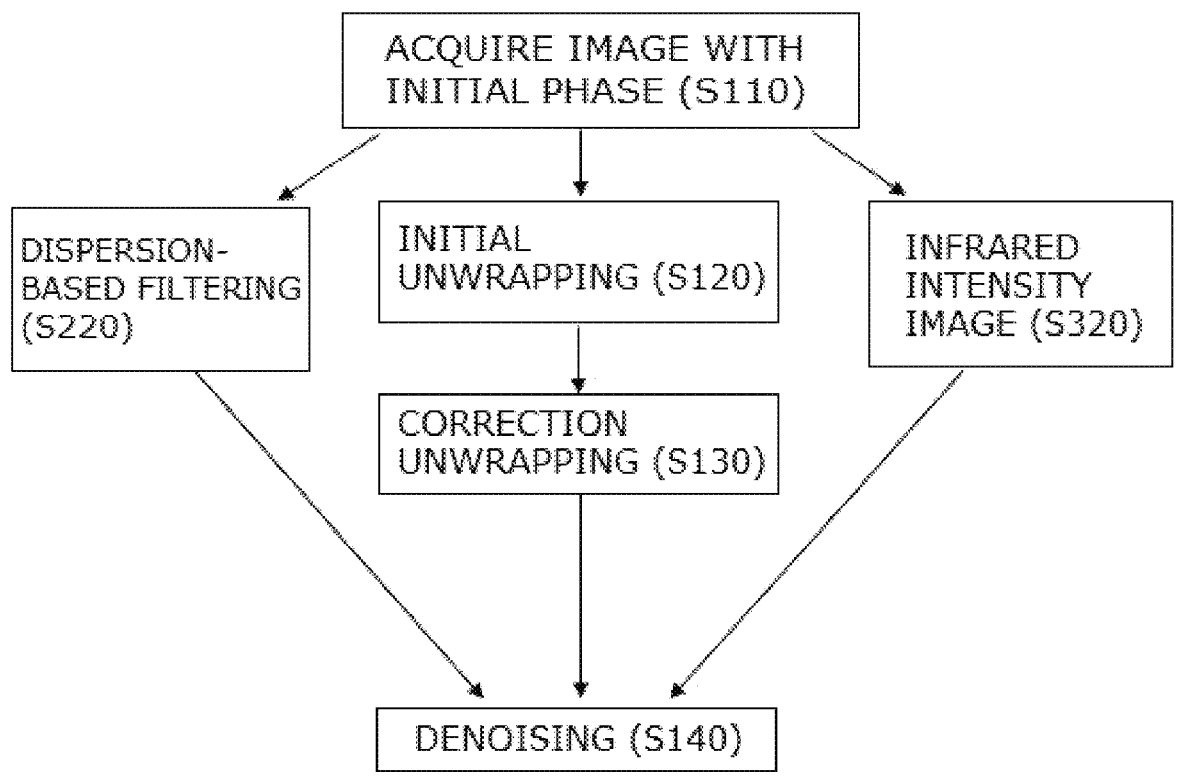
FIG. 9 is a flowchart of a process of properly denoising a pixel area where a lot of noise is involved according to an embodiment.
Figure 10:
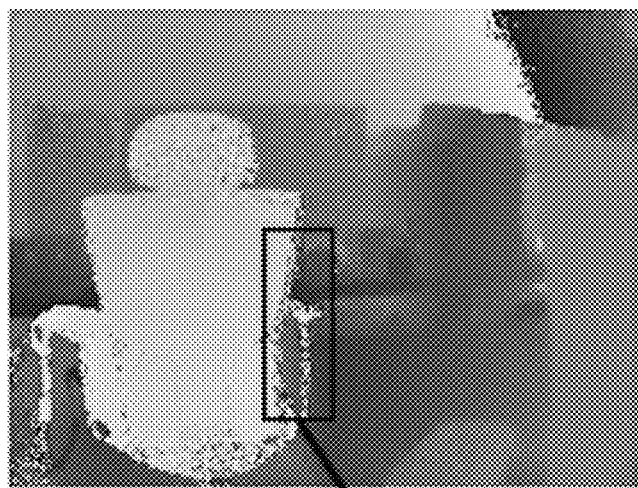
FIG. 10 is illustrates a reliability evaluation image according to an embodiment.
Figure 10:
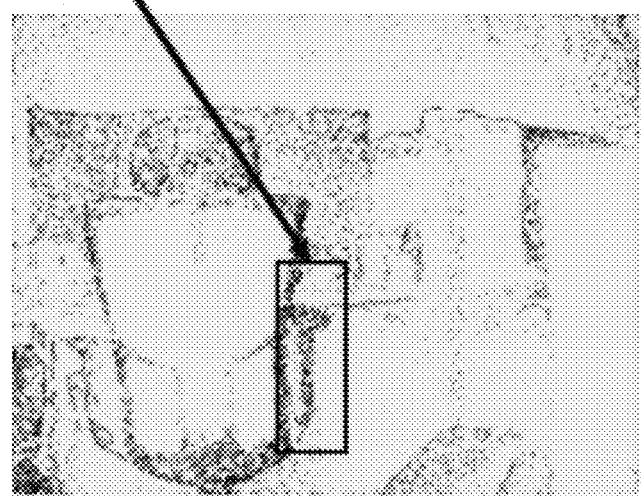

Another embodiment of the present disclosure will be described below in more detail with reference to FIG. 9. An initial image is acquired from the TOF camera (step S110). In order to acquire the initial image, a calculation process using a phase restoration algorithm may be used as needed. An image is acquired by unwrapping the initial image (step S120), and an unwrapped image is acquired by correcting the image (step S130). A process of acquiring the corrected unwrapped image may be an embodiment of the present disclosure described above. An image, whose reliability may be evaluated through dispersion-based filtering, is acquired from the initial image (step S220). In such a case, it is preferable to calculate a dispersion value as a reliability value or to calculate a dispersion value by using appropriate scaling. In the reliability evaluation, it is necessary to set the reliability value of an area including a lot of noise to be small. It is empirically known that a lot of noise is involved when a subject surface is black or the orientation direction of the subject surface is changing. For reference, since the pixel value of an area including a lot of involved noise changes significantly, a dispersion value thereof is also increased. When a dispersion value is low, a high reliability value is set. This is well described in the drawing of FIG. 10. FIG. 10 illustrates an example of applying a process in which the reliability of an area including a lot of noise is set to be low based on a dispersion value in the image with the first frequency of 80.32 MHz. Particularly, FIG. 10 illustrates a case where a lot of noise is involved in an area where the orientation direction of a subject surface changes.

Figure 2:
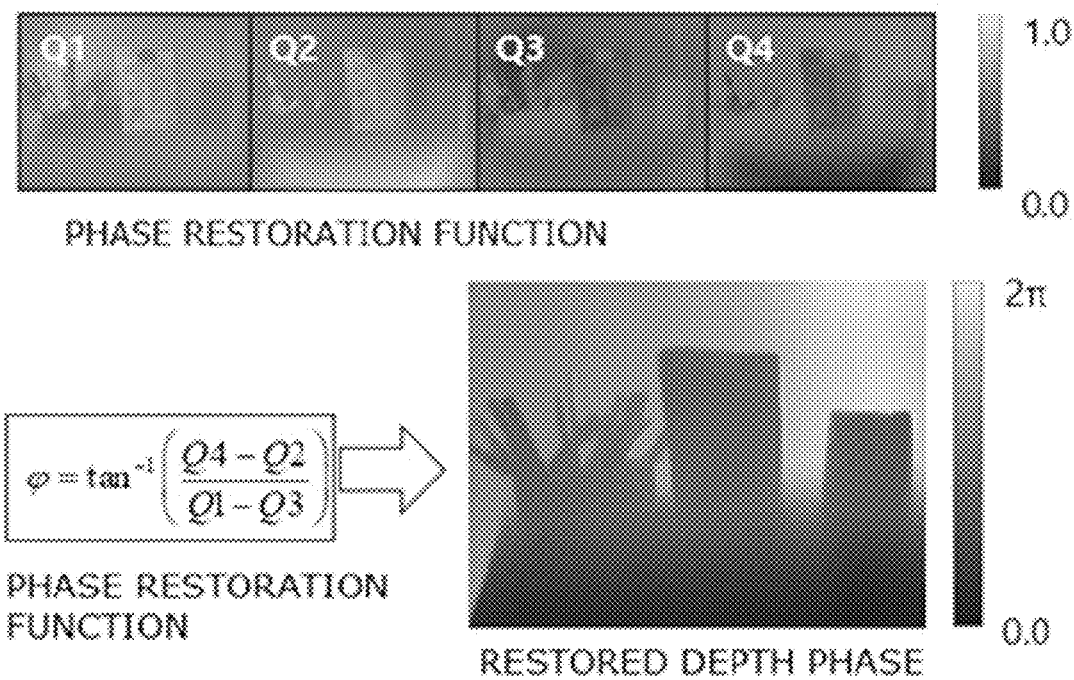
FIG. 2 illustrates a principle of restoring an image captured by a TOF camera.
Figure 11:
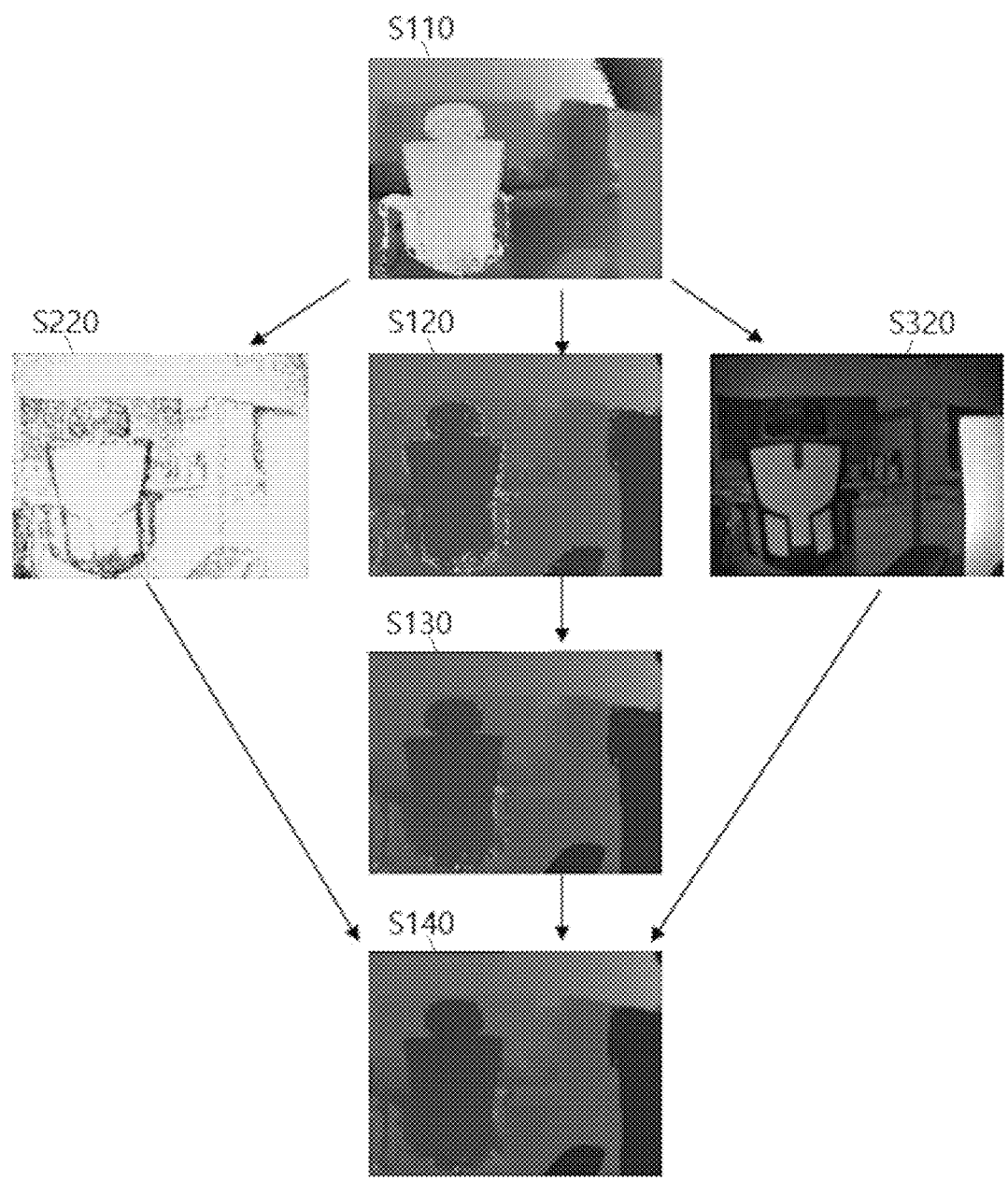
FIG. 11 is a step-by-step view of images derived during a denoising process according to an embodiment.

Next, an infrared intensity image is separately acquired from the initial image (step S320). The infrared intensity image refers to amplitude information determined using the amplitude information of the initial image data for all of the phases; for example, in an embodiment, the four images respectively corresponding to phases Q1, Q2, Q3, and Q4 shown in FIG. 2 may be combined by summation to produce the infrared intensity image. For reference, the aforementioned reliability image uses a phase value or a frequency value of the initial image, whereas the infrared image uses the amplitude information. By performing a denoising step (S140) of removing noise from the corrected unwrapped image using the dispersion-based reliability image and the infrared intensity image, a resultant image is acquired. FIG. 11 illustrates images acquired in each step for reference.

In the denoising step (S140), the intensity value of the infrared intensity image is used as a guide image for reference. Furthermore, in the processing of the initial image acquired from the TOF camera or the denoising step, a well-known algorithm such as a Bilateral Solver may be used or other algorithms may also be used. When the Bilateral Solver is applied, a denoised depth image may be acquired by substituting pixel values of a high-reliability surrounding area for pixel values of a low-reliability surrounding area, using the guide image and the reliability area to determine when to perform such substitutions.

Although the present disclosure has been described with reference to the embodiments illustrated in the drawings, these are for illustrative purposes only, and those skilled in the art will appreciate that various modifications and other equivalent embodiments are possible from the embodiments. Thus, the true technical scope of the present disclosure should be defined according to the appended claims.

What is claimed is:

1. An image acquisition method for a Time Of Flight (TOF) camera, the image acquisition method comprising:
    acquiring a first image using a first frequency;
    acquiring a second image using a second frequency;
    producing an initial unwrapped image based on the first and second images;
    selecting a partial area from the unwrapped image;
    distinguishing one or more erroneously unwrapped pixels of the partial area from remaining pixels of the partial area by comparing the number of unwrapped pixels included in two phase sections; and
    moving an erroneously unwrapped pixel from a phase section to which it has been initially unwrapped to another phase section, wherein one of the two phase sections includes fewer unwrapped pixels than the other phase section.

2. The image acquisition method of claim 1, further comprising:
    processing the partial area using a mode filter before moving the erroneously unwrapped pixel.

3. The image acquisition method of claim 1, wherein distinguishing the one or more erroneously unwrapped pixels includes performing a mathematical process for analyzing unwrapped values of pixels belonging to the partial area.

4. The image acquisition method of claim 3, wherein the mathematical process includes creating a histogram.

5. The image acquisition method of claim 3, wherein the mathematical process includes determining a dispersion value.

6. The image acquisition method of claim 3, wherein the mathematical process is for distinguishing the erroneously unwrapped pixels.

7. The image acquisition method of claim 1, wherein moving the erroneously unwrapped pixel is based on a value selected from one period of the first frequency and one period of the second frequency.

* * * * *